United States Patent [19]

Green et al.

[11] Patent Number: 5,583,300
[45] Date of Patent: Dec. 10, 1996

[54] DUAL SENSOR VORTEX FLOW METER

[75] Inventors: Gilbert S. Green, Millis, Mass.; Richard W. Kalinoski, Rumford, R.I.

[73] Assignee: The Foxboro Company, Foxboro, Mass.

[21] Appl. No.: 411,360

[22] Filed: Mar. 23, 1995

Related U.S. Application Data

[63] Continuation of Ser. No. 239,155, May 6, 1994, abandoned.
[51] Int. Cl.$^6$ .................................................. G01F 1/32
[52] U.S. Cl. ........................................................ 73/861.24
[58] Field of Search ...................... 73/861.22, 861.24, 73/195, 197, 417, 861.47

[56] References Cited

U.S. PATENT DOCUMENTS

| | | | |
|---|---|---|---|
| 3,722,273 | 3/1973 | Yamasaki et al. | 73/861.22 |
| 4,193,420 | 3/1980 | Hewson | 137/356 |
| 4,285,237 | 8/1981 | Romijn | 73/714 |
| 4,466,290 | 8/1984 | Frick | 73/756 |
| 4,520,678 | 6/1985 | Koziol et al. | 73/861.24 |
| 4,602,657 | 7/1986 | Anderson et al. | 137/595 |
| 4,694,702 | 7/1987 | Amemori et al. | 73/861.24 |
| 4,711,268 | 12/1987 | Coleman | 137/597 |
| 4,862,750 | 9/1989 | Nice | 73/861.24 |
| 4,884,441 | 12/1989 | Lew | 73/861.24 |
| 5,209,258 | 5/1993 | Sharp et al. | 73/861.47 |

OTHER PUBLICATIONS

Foxboro PSS 1–8A1 D Product Specifications for E83FA and E83WA Copyright Mar. 1993.

*Primary Examiner*—Richard Chilcot
*Assistant Examiner*—Harshad Patel
*Attorney, Agent, or Firm*—Clare Hartnett; Jules Jay Morris

[57] ABSTRACT

A dual sensor vortex flow meter providing fluid connections for two sensors and containing isolation valves providing the further capability of separate valve control of the fluid communication to each of the dual sensors is herein disclosed. The vortex flow meter is mounted onto a flow meter body having an existing sensor cavity for housing a single sensor. The vortex flow meter is fitted into the existing sensor cavity by means of a dummy-cast sensor. On either side of the dummy sensor are apertures coupled to flow passages that transmit the alternating differential pressure fluctuations caused by the vortices from each side of the dummy sensor to the corresponding sides of each of the dual sensors. The dual sensor vortex flow meter may also include valves for controlling the process flow transmission to each of the sensors.

9 Claims, 8 Drawing Sheets

DUAL SENSOR VORTEX FLOW METER

This is a continuation of application Ser. No. 08/239,155 filed on May 6, 1994, now abandoned.

BACKGROUND

1. Technical Field

This invention relates to a flow measuring apparatus, and, more particularly, to vortex shedding flow meters having sensor means for detecting vortices generated according to fluid flow.

2. Background Art

For many industrial processes, it is common practice to measure a process flow within a pipe using the principle of vortex shedding. Numerous types of vortex flow meters have been designed utilizing this principle to measure the physical characteristics of the fluid flow by sensing the frequency of the vortex formation. Typically, these vortex meters comprise a vortex-shedding body mounted in a flow pipe together with a sensor for detecting the frequency of vortex formation. The sensors used to detect the vortices often contain two highly corrosion resistant process isolation diaphragms which serve to transmit the alternating differential pressure fluctuations caused by the shedding vortices to an internal sensor element through either the sensors internal fill fluid or through mechanical coupling. The fluid flow velocity is proportional to the frequency of vortex shedding.

An example of such a vortex flow meter is The Foxboro Company's E83 series vortex flow meter with optional isolation manifold, described in The Foxboro Company, Product Specification Sheet, PSS 1-8A1 D. This flow meter contains a pipe section containing a shedding plate for generating alternating vortices. A sensor, mounted slightly above the shedder plate, is used for sensing the vortices and generating an electronic signal representative of the shedding frequency. This signal is then transmitted to a processing element contained in an electronic housing for amplification and conditioning of the signal. An isolation manifold is provided for valve control of the fluid communication to the sensors. The isolation manifold is beneficial when the sensor requires maintenance, repair, replacement, or the like, since it disengages the process flow from the sensor without requiring the entire process to be shut off.

A constraint of this type of vortex flow meter is that the measurements depend on the accuracy of one sensor. Sensors do not always operate accurately as they are subject to breakage and malfunctions. In these instances, the measurement of the process flow is interrupted in order to either replace, repair, clean, calibrate, or maintain the sensor. This interruption of the process flow measurement is a limitation on the above vortex flow meter.

It is an object of this invention to provide a vortex flow meter with redundant sensor capability for continuous measurement of a process flow.

It is another object of this invention to provide a vortex flow meter with redundant sensor capability with continuous measurement from a common source point in the process flow.

A more specific object of the invention is to provide dual sensors for use in a vortex flow meter having a process flow such that the sensors enable the process to remain operational despite the malfunction or failure of one of the sensors and to provide a cross check on the computational accuracy of each of the sensors.

A more specific object of the invention is to provide dual sensors for use in a vortex flow meter having isolation valves which can isolate the sensors from the process flow such that either one or both sensors can be replaced without shutting down the process, and without interrupting the measurement of the process flow rate.

A further object of the invention is to provide a cost effective dual sensor vortex flow meter that does not require additional modification to the flow meter body.

SUMMARY

This invention results from the realization that redundant sensor capability enables continuous process measurement despite sensor malfunction or the need for periodic maintenance.

The first embodiment features a dual sensor vortex flow meter containing a support base housing two sensors and providing process fluid connections to the two sensors. The vortex flow meter is mounted onto a flow meter body containing an existing cavity which normally houses a single sensor. The support base is fitted into the existing sensor cavity by means of a dummy-cast sensor. On either side of the dummy-cast sensor are apertures coupled to flow passages that transmit the alternating differential pressure fluctuations caused by the vortices from each side of the dummy-cast sensor to the corresponding sides of each of the dual sensors.

The second embodiment features the dual sensor vortex flow meter of the first embodiment with the additional feature of dual isolation valves. The isolation valves allow for the replacement of either one of the sensors without having to shut down the process flow or lose the process flow measurement. There is an isolation valve for each sensor which is connected to the sensor's process fluid flow passages. A valve handle for each sensor provides the capability of disengaging the process fluid from the sensor when sensor replacement, maintenance, repair or the like are required.

BRIEF DESCRIPTION OF THE DRAWINGS

The foregoing and other objects, features and advantages of the invention will be apparent from the following more particular description of two preferred embodiments of the invention, as illustrated in the accompanying drawings in which like reference characters refer to the same parts throughout the different views. The drawings are not necessarily to scale, emphasis instead being placed on illustrating the principles of the invention.

DESCRIPTION OF THE ILLUSTRATED EMBODIMENT

A dual sensor vortex flow meter providing fluid connections for two sensors and containing isolation valves providing the further capability of separate valve control of the fluid communication to each of the dual sensors is herein disclosed.

Figure 1:
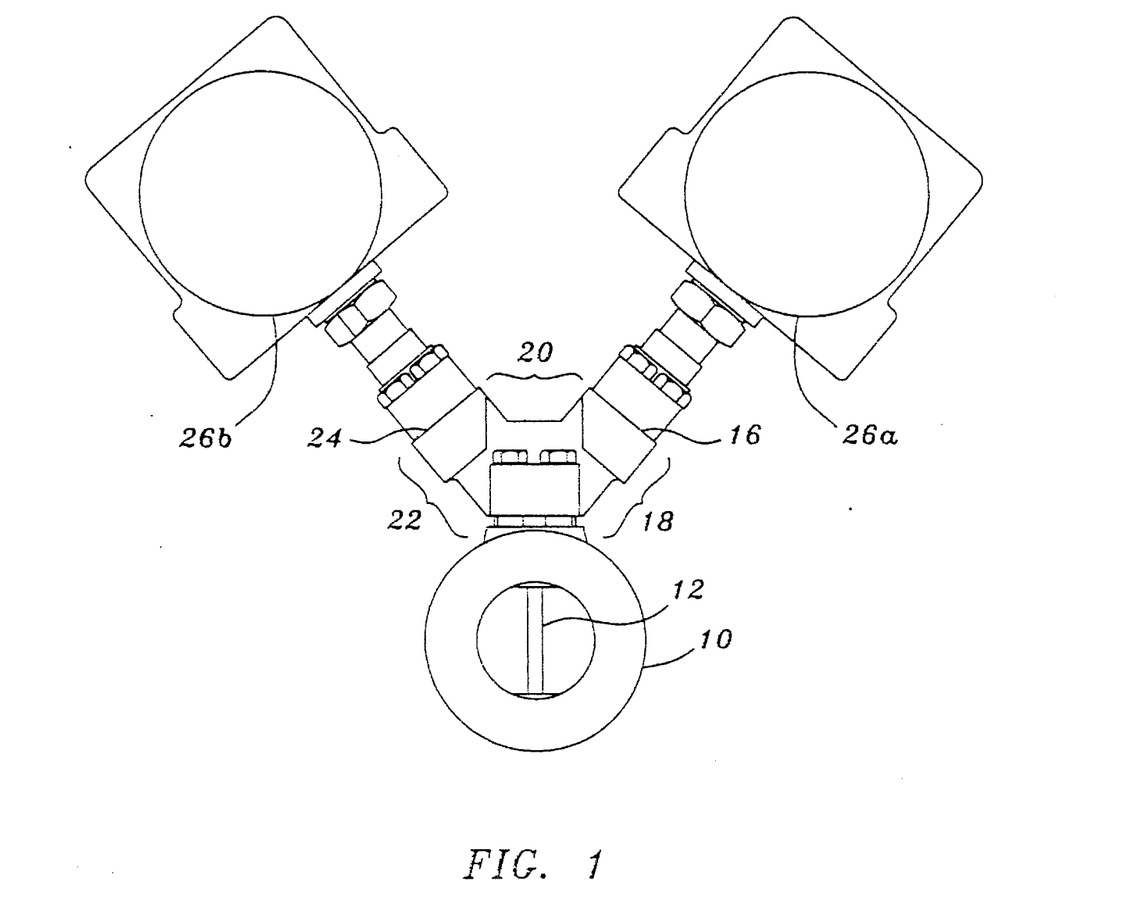
FIG. 1 is an end view of a vortex flow meter with the dual sensor manifold according to the first preferred embodiment of the invention.

FIG. 1 is an end view of a vortex flow meter according to a first embodiment containing flow meter body 10 for use in a flow pipe having a process flow, and shedder bar 12 for generating alternating differential pressure vortices. Manifold 20 is mounted on top of flow meter 10. Manifold 20 is a Y-shaped structure containing a right branch 18 and a left branch 22. The elements contained in each branch are structurally and operationally identical. In each branch is a sensor for detecting the shedding frequencies produced from shedder bar 12. Right branch 18 contains a supporting base 16 onto which is mounted electronic housing 26a containing electronic circuitry for amplifying and conditioning signals produced from one sensor. Similarly, left branch 22 contains a supporting base 24 onto which is mounted electronic housing 26b containing electronic circuitry for amplifying and conditioning signals produced from the second sensor.

Figure 2:
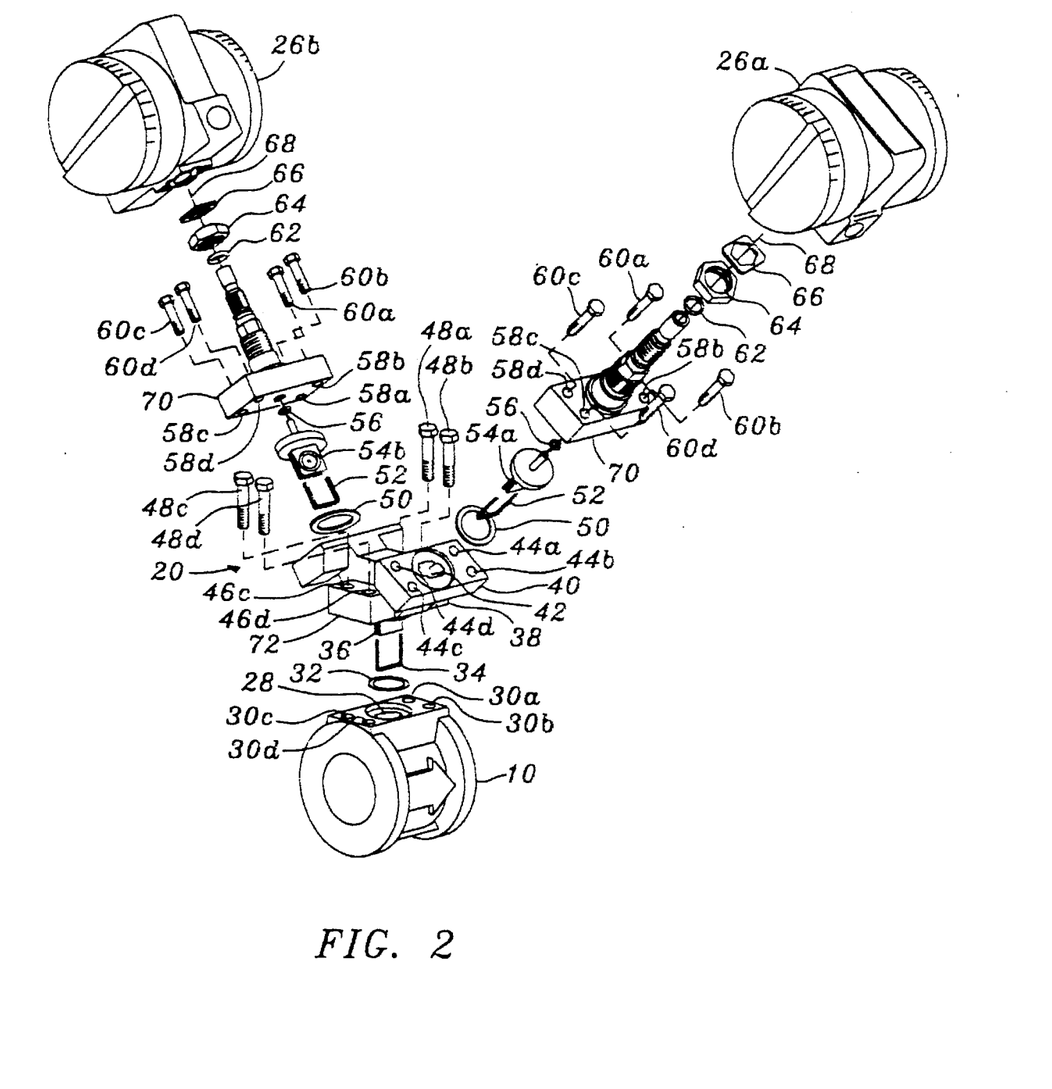
FIG. 2 is an exploded perspective view of the vortex flow meter of FIG. 1 further depicting all the component parts.
Figure 3:
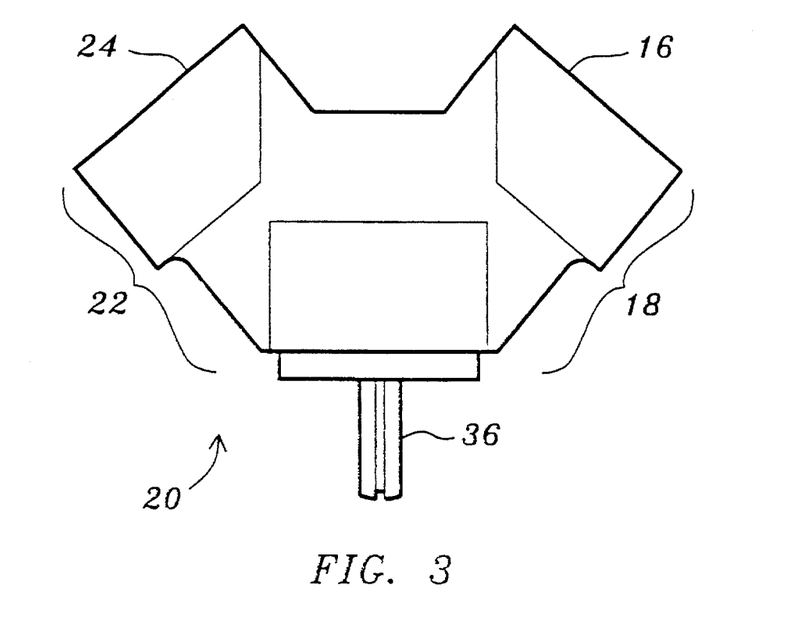
FIG. 3 is a side elevation of the dual sensor manifold as used in the first preferred embodiment.

Referring to FIG. 2, manifold 20 is mounted on top of flow meter body 10 through cylindrical opening 28. At the bottom of manifold 20 is an integrally cast dummy sensor and flow divider 36. For the purposes of this application, the terms cast dummy sensor, dummy-cast sensor, cast of dummy sensor, sensor casting, and cast dummy sensor and flow divider, are used synonymously. The cast of dummy sensor 36 is used to fit manifold 20 to the flow meter body without requiring a modification to the flow meter body. This design has the economic advantage of making the flow meter body easily adaptable for either a dual or single sensor configuration. U-shaped gasket 34, preferably fabricated of a high-temperature material, is fitted around dummy-cast sensor 36 providing a pressure barrier which causes the alternating differential pressure to be established across the faces of dummy-cast sensor 36. Circular gasket 32 is placed over cylindrical opening 28 between flow meter body 10 and manifold 20. Manifold 20, with U-shaped gasket 34 fitted around sensor casting 36, is positioned into flow meter body 1 through cylindrical opening 28 having circular gasket 32 between the respective contact surfaces.

Figure 6:
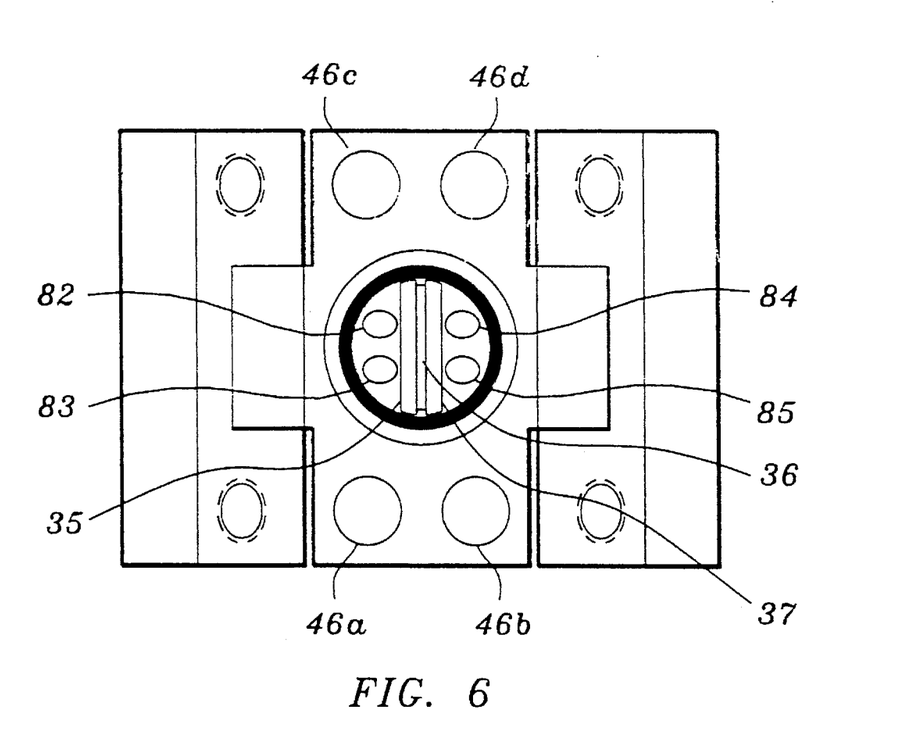
FIG. 6 is a bottom view of the dual sensor manifold as used in both embodiments.

Referring to FIGS. 2 and 6, manifold 20 is bolted onto flow meter body 10 by four bolts, 48a, 48b, 48c, 48d, which pass through holes 46a, 46b, 46c, 46d in manifold mounting base 72, and are threaded into holes 30a, 30b, 30c, 30d respectively in meter body 10.

Figure 5:
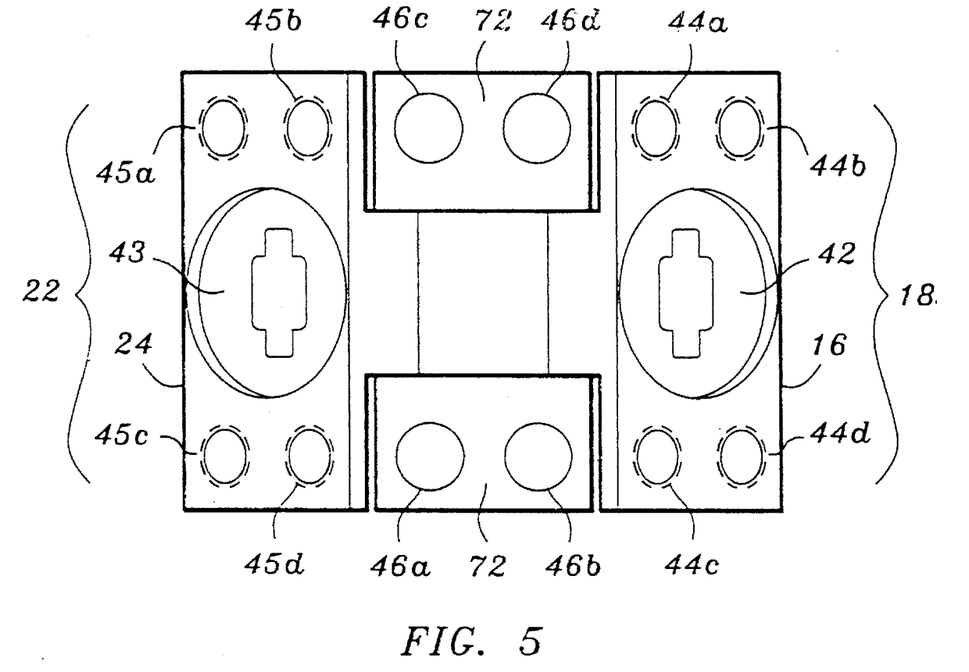
FIG. 5 is a plan view of the dual sensor manifold as used in the first embodiment.

FIG. 5 is a plan view of the supporting bases of each branch of the manifold. Referring to FIGS. 2 and 5, supporting base 16 of right branch 18 consists of sensor slot 42 with four threaded holes 44a, 44b, on one side of slot 42 and threaded holes 44c, 44d on the opposite side. Supporting base 24 of left branch 22 is identical having sensor slot 43 with threaded holes 45a, 45b on one side of slot 43 and threaded holes 45c, 45d on the opposite side.

Positioned in sensor slot 42 is a vortex sensor 54a, and in sensor slot 43 is vortex sensor 54b, both having a sensor housing containing a sensor element (not shown). The sensor housing has two highly corrosion resistant process isolation diaphragms which serve to transmit the alternating differential pressure fluctuations caused by the shedding vortices to an internal sensor element through the sensor's internal fill fluid, or through mechanical coupling. The sensor element generates a signal representative of the shedding frequency of the vortices, which is proportional to the flow velocity, through a cable to appropriate circuitry contained in electronic housing 26a, 26b. An example of one such sensor is found in U.S. Pat. No. 5,209,125 to Kalinoski et al.

The sensor elements, the components used for mounting the sensor elements to the manifold, and their electronic housings are identical for both branches of the manifold. Therefore, for the purposes of this application, a description of these elements is presented for one branch since they are identical in the second branch.

Referring to FIGS. 2 and 5, the bottom portion of sensor 54a is fitted with U-shaped gasket 52, preferably made of high-temperature material, which serves to create a pressure barrier between the two sides of the sensor, so that the sensor experiences essentially the same alternating differential pressure as dummy-cast sensor 36. Sensor gasket 50 is placed between the contact surfaces of the sensor when the sensor is seated into manifold 20. Bonnet 70 is placed over sensor 54a and bolted onto manifold 20, thereby securing sensor 54a to manifold 20. Bonnet 70 is bolted onto manifold 20 by four bonnet mounting bolts 60a, 60b, 60c, 60d which pass through bonnet holes 58a, 58b, 58c, 58d and are threaded into tapped holes 44a, 44b, 44c, 44d in manifold 20.

FIG. 6 is a bottom view of manifold 20 and depicts apertures 82, 83, 84, 85, located on either side of dummy-cast sensor 36. Referring to FIGS. 2 and 6, each aperture is coupled to a flow passage providing fluid communication to sensor 54. These passages transmit the alternating pressure fluctuations caused by the flow vortices generated by shedder plate 12 from each side of dummy-cast sensor 36 to the respective sides of sensor 54. The purpose of these apertures and flow passages is to transmit the alternating pressure fluctuations to sensors 54a, 54b simultaneously as if each sensor was in the position of dummy-cast sensor 36. This purpose then enables sensors 54a, 54b to make redundant measurements from a common source point in the process flow.

The vortices produced by the shedder bar create an alternating differential pressure between the left side, 35, and the right side 37 of dummy-cast sensor 36. At one instant of time, the left side, 35, experiences the maximum or high pressure while the right side, 37, experiences the minimum or low pressure. One half of a vortex shedding cycle later the left side, 35, experiences the minimum pressure, while the right side, 37, experiences the maximum pressure. Hence, a sinusoidal pressure fluctuation occurs across dummy-cast sensor 36. For purposes of the following discussion, the vortex shedding cycle will be frozen in time such that side 35 will be denoted the high pressure side and side 37, the low pressure side.

Figure 4:
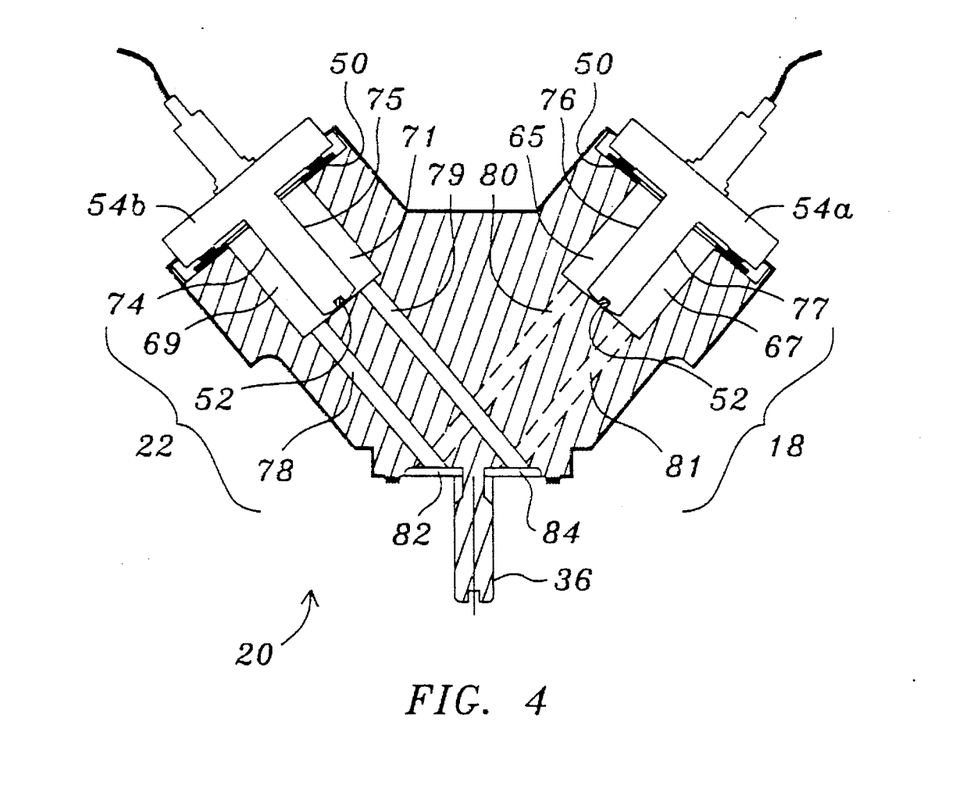
FIG. 4 is a vertical cross-sectional view of the manifold of FIG. 3.

With reference to FIGS. 4 and 6, apertures 82, 83 are located on the high side of dummy-cast sensor 36 and serve to transmit the high pressure to the high sides of sensors 54a, 54b simultaneously. Aperture 82 is coupled to flow passage 78 and aperture 83 is coupled to flow passage 80. Flow passage 78 is coupled to high side 74 of sensor 54b at chamber 69 and flow passage 80 is coupled to high side 76 of sensor 54a at chamber 65.

Similarly, apertures 84, 85 are located on the low side of dummy-cast sensor 36 and serve to transmit the low pressure to the low sides of sensors 54a, 54b. Aperture 84 is coupled to flow passage 79 and aperture 85 is coupled to flow passage 81. Flow passage 79 is coupled to low side 75 of sensor 54b at chamber 71 and flow passage 81 is coupled to low side 77 of sensor 54a at chamber 67.

The operation of the vortex flow meter will now be described in detail. The process fluid flows through the flow pipe to shedder plate 12 which generates the alternating vortex pressure fluctuations. These vortices are transmitted through two internal meter body chambers (not shown) to opposite sides of dummy-cast sensor 36. The high-pressure vortex fluctuations transmitted to side 35 are transmitted simultaneously through apertures 82, 83 through flow passages 82, 80 to the high sides of sensors 54a, 54b respectively. Simultaneously, the low-pressure vortex fluctuations transmitted to side 37 of sensor 36 are transmitted through apertures 84, 85 through flow passages 79, 81 to the low sides of sensors 54a, 54b respectively. These pressure fluctuations are, in turn, detected by sensors 54a, 54b. An electronic signal, representative of the shedding frequency, is then transmitted from the sensors to processing elements contained in electronics housing 26a, 26b respectively.

The second preferred embodiment extends the vortex flow meter described in the above first embodiment with isolation valves, providing valve control of the fluid passages to the sensors. This additional capability is beneficial for isolating one or both of the sensors from fluid communication or flow when sensor maintenance, repair, replacement, or the like is needed. It also makes it feasible to replace the sensor without interrupting the process flow or its measurement.

Figure 7:
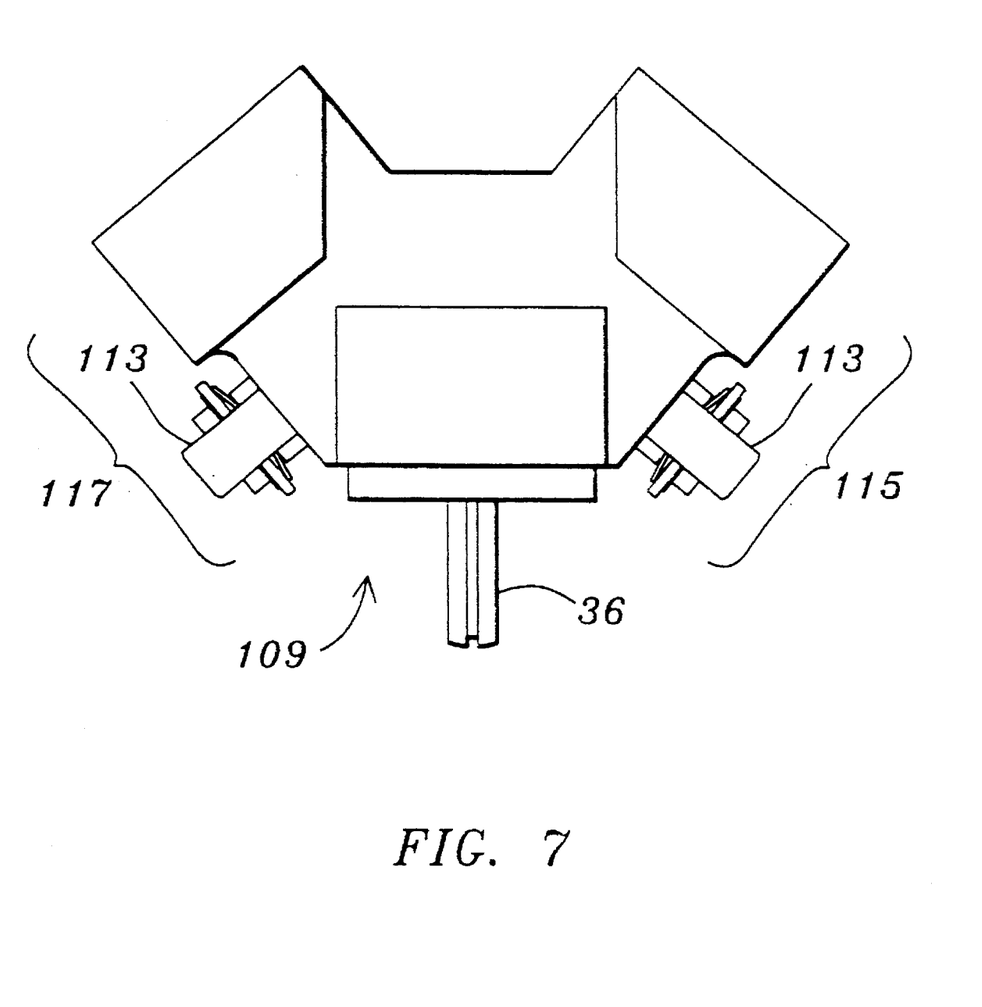
FIG. 7 is a side elevation of a dual sensor manifold having isolation valves as used in the second preferred embodiment.
Figure 10:
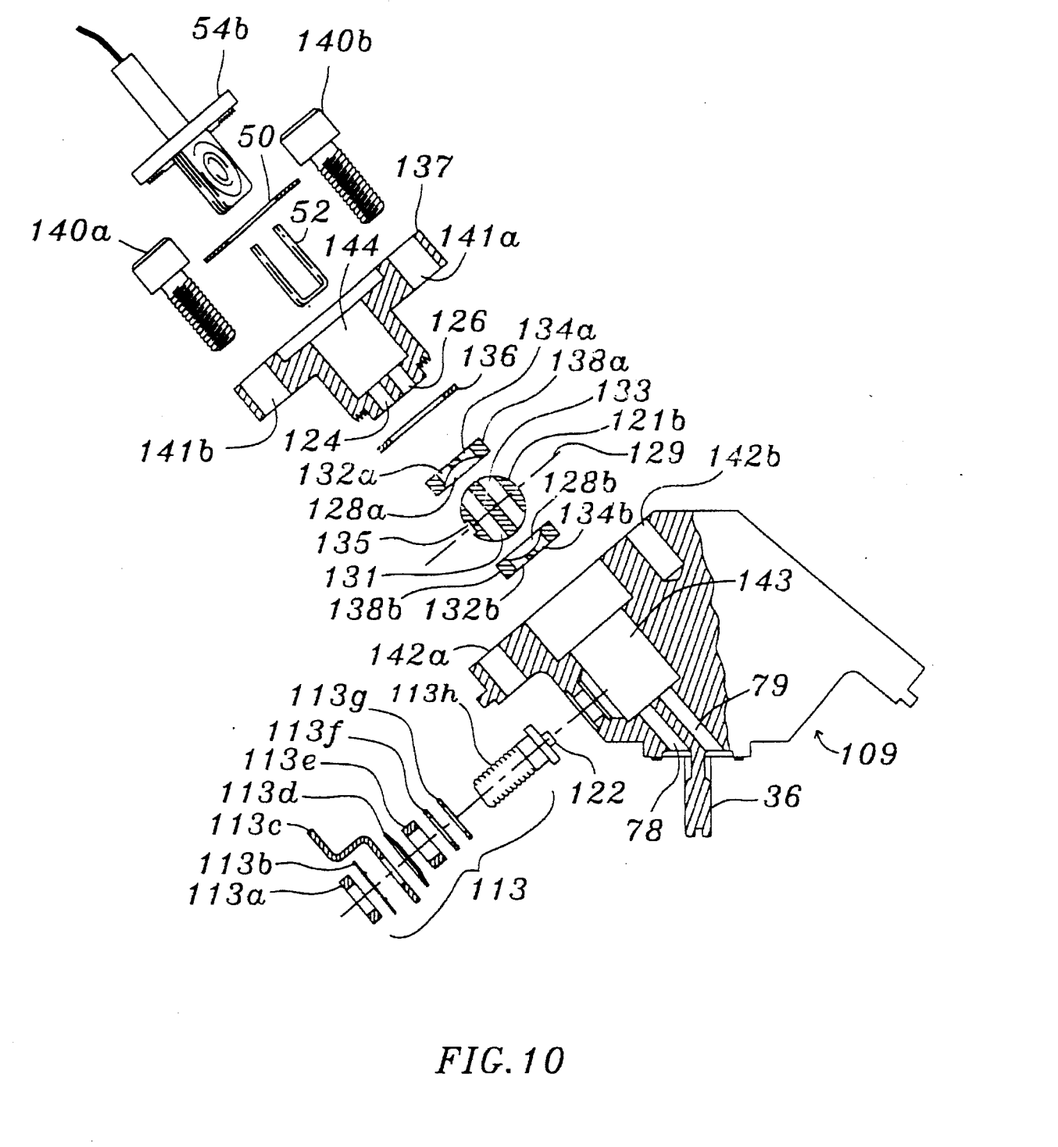
FIG. 10 is an exploded cross-sectional view of the dual sensor manifold with isolation valves of FIG. 8 further depicting all the component parts for the left-sensor branch.

The second embodiment of the manifold incorporates some of the same structural features used in the first embodiment. Specifically, the sensor bonnet 70, electronic housings 26a, 26b, and the corresponding mounting bolts and gaskets which secure the sensor and the electronic housings to the manifold are identical as described above in the first embodiment. Likewise, the shape of the manifold is similar. With reference to FIGS. 7 and 10, manifold 109, is of a Y-shape structure having a right branch 115 and a left branch 117. However, right and left branches 115, 117 are of an elongated length as they house a valve control mechanism.

Figure 8:
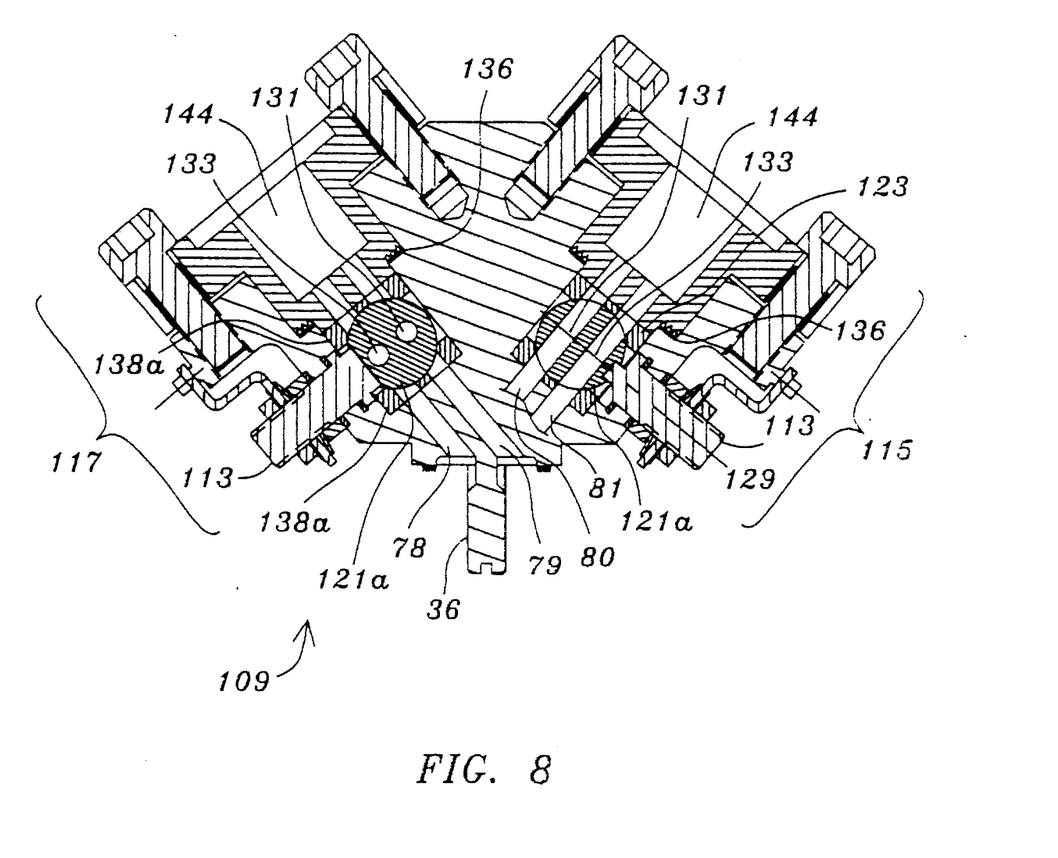
FIG. 8 is a vertical cross-sectional view of the manifold of FIG. 7.
Figure 9:
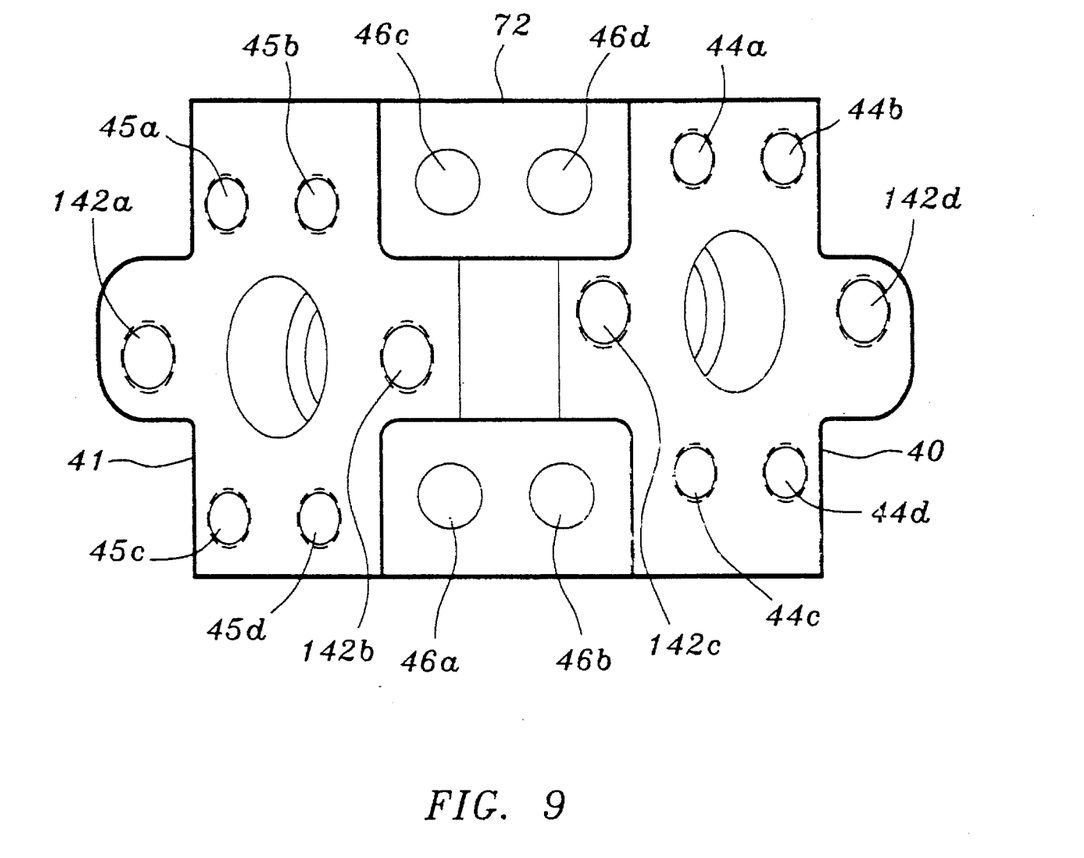
FIG. 9 is a plan view of the dual sensor manifold of the second embodiment.

With reference to FIGS. 8 and 10, each sensor has a ball valve control mechanism, coupled to each of the respective sensor flow passages, for isolating one or both of the sensors from the process flow. It should be noted that this embodiment is not limited to a ball-valve type of valve mechanism. Other valve types may be used, such as, but not limited to, needle-type valves, and flat circular-disc valves. The ball valve consists of a stainless steel ball, 121, having two circular flow passages, 131, 133, that function as fluid conduits. The ball is positioned in housing, 143, secured by seals 138a, 138b. The ball's flow passages, 131, 133, are of the same width as the sensor's flow passages, 78, 79, 80, 81. When the ball is in the open position, as shown by ball 121a, flow passages 131, 133, are aligned with flow passages 80, 81 providing a fluid conduit for the process flow to be transmitted to the sensor. When the ball is in the closed position, as shown by ball 121b, flow passages 131, 133 are not aligned with flow passages 78, 79, thereby blocking fluid communication to the sensor. Referring to FIG. 10, seals 138a, 138b are made of a high temperature resistant material having a pair of flow passages 132, 134 that are coupled to flow passages 78, 79, respectively, forming a flow passage for the process fluid to reach the sensor. Seal 138b is positioned at the bottom of housing 143 having the bottom surface of ball 121b resting in semi-circular cavity 128b. Seals 138a, 138b serve to isolate the process fluid contained in each flow passage from one another ensuring that the differential pressure measurement is not attenuated by leaks from one flow passage to the other flow passage. They also serve to prevent external leakage of the process fluid when the valve is in the closed position.

Ball 121 and seals 138a, 138b are secured into housing 143 and manifold 109 by valve bonnet 137 which is fitted onto manifold 109. Gasket 136 is placed between the surface of valve bonnet 137 and manifold 109 in order to prevent external leaks. Valve bonnet 137 is bolted to manifold 109 by means of bolts 140a, 140b which pass through holes 141a, 141b on valve bonnet 137 and are threaded into holes 142a, 142b on manifold 109. Valve bonnet 137 contains sensor chamber 144 used for housing sensor element 54b. The bottom base of valve bonnet 137 contains two flow chambers 124, 126 which are coupled to flow passages 78, 79 through conduits 131–132, 133–134 respectively. Flow chambers 124, 126 serve to transmit the alternating differential pressure fluctuations to both sides of sensor 54b in sensor chamber 144.

With reference to FIGS. 2 and 10, sensor 54b is secured into sensor chamber 144 by bonnet 70 in an identical manner as described above in the first embodiment. Likewise, electronic housing 26b is mounted onto bonnet 70 having electronic circuitry for amplfying and conditioning signals produced from senor 54b.

With reference to FIG. 10, the ball valve also comprises valve-handle mechanism 113, having valve stem 113h, for rotating the ball valve to the open or closed position. Valve stem 113h contains a protrusion 122 that fits into rectangular indent 135 of ball 121b, thereby aligning valve-handle mechanism 113 and ball 121b on the same horizontal rotational axis. Valve stem 113h is further secured to manifold 109 by a series of washers, gaskets, and nuts: interior gasket 113g, exterior gasket 113f, washer 113e, Belleville spring washer 113d, valve handle 113c, lock washer 113b, and nut 113a. Belleville spring washer 113d serves to create a spring load, compressing gaskets 113f, 113g thereby forming a seal securing valve stem 113h to manifold 109 in order to prevent process fluid leakage. Nut 113a and lock washer 113b serve to securely fasten valve handle 113c to the valve stem and manifold 109.

Referring to FIG. 8, the operation of the ball valve relies on its horizontal rotational axis, 129. To turn the valve on, as shown by ball 121a, valve handle 113 is rotated at a certain angle in one direction, thereby aligning the ball's internal chambers 131, 133, with the sensor's flow passages 80, 81. To eliminate fluid communication, as shown by ball 121b, valve handle, 113, is rotated at a certain angle in the opposite direction, thereby blocking flow passages 78, 79 and the process fluid from flowing to the sensor.

The dual sensor vortex flow meter as described above has the advantages of redundant sensor capability enabling continuous flow measurement despite the malfunction of one of the sensors, and provides a cross check on the computational accuracy of each of the sensors. The redundant flow measurement is made from a common source point in the process flow thereby enhancing the accuracy of both measurements. The isolation valves provide separate valve control of the fluid communication to each of the dual sensors. This is advantageous for sensor replacement, repair, maintenance or the like. This vortex flow meter has the additional economic advantage of not requiring any modification to the flow meter body.

Although the preferred embodiments of the invention have been described hereinabove in detail, it is desired to emphasize that this is for the purpose of illustrating the invention and thereby to enable those skilled in this art to adapt the invention to various different applications requiring modifications to the apparatus described hereinabove; thus, the specific details of the disclosures herein are not intended to be necessary limitations on the scope of the present invention other than as required by the prior art pertinent to this invention.

We claim:

1. A flow-metering apparatus of the vortex-shedding type comprising:
   a) a flow-pipe section fluidly connected to a process flow, said flow-pipe section having a single divided cavity for allowing communication with the process flow, said single divided cavity forming a single fluid connection to said process flow;
   b) a vortex-generating body mounted in said flow-pipe section for generating alternating differential pressure fluctuations;
   c) a plurality of sensor elements, each of said sensor elements having first and second sides, said first and second sides being on opposite sides of said sensor element, each of said first and second sides subjected independently to the alternating differential pressure fluctuations from said single fluid connection;
   d) a mounting support, removably mounted to said flow-pipe section, housing said sensor elements and securing said sensor elements to said flow-pipe section, said sensor elements removably mounted within said mounting support, said sensor elements positioned spatially apart from each other in said mounting support, said mounting support having flow passages for transmitting the alternating differential pressure fluctuations to said sensor elements, said flow passages communicating with the process flow through said single divided cavity;
   e) electrical transmission means connected to said sensor elements to conduct signals representative of said process flow; and
   f) computation means connected to said electrical transmission means, and removably mounted to said mounting support, for processing said signals transmitted from said electrical transmission means and producing electronic signals indicative of physical measurement quantities of said process flow.

2. A flow-metering apparatus as in claim 1 wherein said mounting support further comprises a flow divider positioned in said single divided cavity of said flow-pipe to maintain differential flow through said flow passages by dividing the cavity.

3. A flow-metering apparatus as in claim 1 wherein said sensor elements comprise first and second sensor elements fluidly connected to a single divided cavity, and
   wherein said flow passages of said mounting support comprise a first pair of flow passages for transmitting the alternating differential pressure fluctuations to said first sensor element, and a second pair of flow passages for transmitting the alternating differential pressure fluctuations to said second sensor element,
   said first pair of flow passages having a first high flow passage and a first low flow passage, said first high flow passage transmitting high pressure fluctuations of said alternating differential pressure fluctuations to said first side of said first sensor element, and said first low flow passage transmitting low pressure fluctuations of said alternating differential pressure fluctuations to said second side of said first sensor element, and
   said second pair of flow passages having a second high flow passage and a second low flow passage, said second high flow passage transmitting high pressure fluctuations of said alternating differential pressure fluctuations to said first side of said second sensor element, and said second low flow passage transmitting low pressure fluctuations of said alternating differential pressure fluctuations to said second side of said second sensor element.

4. A flow-metering apparatus as in claim 3 wherein said computation means comprises a first and second computation element, said first computation element electrically connected to said first sensor element, and said second computation element electrically connected to said second sensor element.

5. A flow-metering apparatus as in claim 3 wherein said mounting support further comprises a first and second valve control device for controlling transmission of the alternating pressure fluctuations to said first and second sensor elements,
   said first valve control device coupled to said first set of flow passages, and
   said second valve control device coupled to said second set of flow passages.

6. A flow-metering apparatus as in claim 1 wherein said mounting support further comprises a plurality of valve control devices, coupled to said sensor elements and said flow passages, for controlling the transmission of the alternating differential pressure fluctuations to said sensor elements.

7. A vortex flow meter comprising:
   a) a flow-pipe section fluidly connected to a process flow, said flow-pipe section having a single divided cavity for allowing communication with the process flow;
   b) a vortex-generating body mounted in said flow-pipe section for generating alternating differential pressure fluctuations;
   c) a first and second sensor means fluidly connected to said fluid flow at said single divided cavity for detecting the alternating differential pressure fluctuations and for producing electronic signals representative thereof,
      said first sensor means having a first side and a second side, said first side of said first sensor means opposite said second side of said first sensor means,
      said second sensor means having a first side and a second side, said first side of said second means opposite said second side of said second sensor means, and
      said first and said second sensor means positioned spatially apart from each other;
   d) a first and second computation means for processing said electronic signals, said first computation means electrically connected to said first sensor means, and said second computation means electrically connected to said second sensor means; and
   e) a manifold for removably housing said first and second sensor means, comprising:
      i) body means;
      ii) a first and second pair of flow passages extending longitudinally through said body means for fluidly connecting said process flow at said single divided cavity to said first and second sensor means, said flow passages communicating with the process flow through said cavity, said first pair of flow passages, transmitting low pressure fluctuations of said alternating pressure fluctuations to said first side of said first sensor means, and transmitting high pressure fluctuations of said alternating pressure fluctuations to said second side of said first sensor means, said second pair of flow passages transmitting low pressure fluctuations of said alternating pressure fluctuations to said first side of said second sensor means, and high pressure fluctuations of said alternating pressure fluctuations to said second side of said second sensor means;

iii) a first and second mounting means in said body means, said first mounting means removably attaching said manifold to said flow-pipe section, and said second mounting means removably attaching said manifold to said first and second computation means.

8. A manifold as in claim 7 further comprising first and second valves for controlling transmission of the alternating pressure fluctuations to said first and second sensing means, said first valve fluidly connected to said first pair of flow passages, and said second valve fluidly connected to said second pair of flow passages.

9. A manifold as in claim 7 wherein said first mounting means further comprises an attachment means and a dummy-cast sensor element positioned in said single divided cavity of said flow-pipe section, to act as a flow divider to divide said single divided cavity and to maintain differential flow through said flow passages.

* * * * *